United States Patent [19]

Andress et al.

[11] Patent Number: 5,776,568
[45] Date of Patent: Jul. 7, 1998

[54] HOLLOW BODY WITH AN INTERNAL SUPPORTING FRAME

[75] Inventors: Heinz Andress, Erdmannhausen; Arthur Klotz, Remseck; Arnold Kuhn, Muellheim, all of Germany

[73] Assignee: Filterwerk Mann & Hummel GmbH, Ludwigsburg, Germany

[21] Appl. No.: 490,985

[22] Filed: Jun. 15, 1995

[30] Foreign Application Priority Data

Jun. 15, 1994 [DE] Germany .......................... 44 20 879.0

[51] Int. Cl.⁶ .............................. F02M 33/00; B32B 3/18
[52] U.S. Cl. ...................... 428/35.7; 428/116; 428/188; 428/189; 428/192; 428/198; 55/522; 96/144; 96/152; 96/189; 123/519
[58] Field of Search ...................... 428/34.1, 35.7, 428/188, 189, 116, 118, 192, 198; 55/DIG. 30, 267, 522; 96/143, 144, 152, 147, 189; 123/519

[56] References Cited

U.S. PATENT DOCUMENTS

| | | | |
|---|---|---|---|
| 3,919,373 | 11/1975 | Kormendi | 264/511 |
| 4,058,380 | 11/1977 | King, II | 55/387 |
| 4,087,260 | 5/1978 | Strathoff et al. | 96/144 |
| 4,167,598 | 9/1979 | Logan et al. | 428/34.1 |
| 4,662,911 | 5/1987 | Hirayama et al. | 428/116 |
| 4,986,840 | 1/1991 | Mori et al. | 123/519 |
| 5,119,791 | 6/1992 | Gifford et al. | 96/144 |
| 5,211,913 | 5/1993 | Hagiwara et al. | 428/35.7 |
| 5,536,541 | 7/1996 | Armellini | 428/36.9 |
| 5,599,384 | 2/1997 | Yoshida et al. | 96/143 |

FOREIGN PATENT DOCUMENTS

| | | |
|---|---|---|
| 514555 | 11/1992 | European Pat. Off. |
| 4315838 | 11/1984 | Germany |
| 04-004123 | 1/1992 | Japan |

OTHER PUBLICATIONS

Patent Abstracts of Japan, Abstract of Japanese Patent Publication No. 61-083020.
Patent Abstracts of Japan, Abstract of Japanese Patent Publication No. 02-239917.
Patent Abstracts of Japan, Abstract of Japanese Patent Publication No. 03-097521.
Patent Abstracts of Japan, Abstract of Japanese Patent Publication No. 55-011823.
Patent Abstracts of Japan, Abstract of Japanese Patent Publication No. 55-079121.

*Primary Examiner*—Rena Dye
*Attorney, Agent, or Firm*—Evenson, McKeown, Edwards & Lenahan P.L.L.C.

[57] ABSTRACT

A hollow body with an internal supporting frame (10) which is connected to a housing (14) at at least two contact points. The housing and the supporting frame are made of synthetic resin material with the housing, which is produced by blow molding, enclosing the supporting frame.

12 Claims, 4 Drawing Sheets

5,776,568

HOLLOW BODY WITH AN INTERNAL SUPPORTING FRAME

BACKGROUND OF THE INVENTION

This invention relates to a hollow body which is produced by blow molding. Japanese Patent Abstract JP 4-004,123 discloses a housing which was produced according to the blow molding method. This housing is used for supplying air in internal combustion engines and is normally referred to as an intake manifold.

In order to produce an intake manifold, a tube-shaped plastic body is introduced into a two-piece mold; the mold is closed, and the interior of the plastic body is acted upon by compressed air. The plastic body is thereby formed to a contour which corresponds to the mold. After solidification of the plastic, the part can be removed and can be provided with appropriate connections.

The blow molding technique has the advantage that even complicated structures are relatively easy to produce, particularly also shapes like containers and similar devices which cannot be removed from the mold in normal plastic injection molding. A disadvantage of the previously known parts produced by the blow molding method was their low stability. In the case of simple containers, this only plays a subordinate role. In the case of complicated parts or containers which must meet higher requirements with respect to dimensional stability, the blow molding method can only be used to a limited extent.

SUMMARY OF THE INVENTION

It is the object of the present invention to provide a housing by means of blow molding which has a high dimensional stability.

This and other objects of the invention are achieved by providing a method of producing a hollow body comprising a housing containing an internal supporting frame in which at least the housing is formed of plastic and the supporting frame is connected to the housing at least two contact points; in which the method comprises inserting the supporting frame into an opened blow molding mold; drawing a plastic tube over the supporting frame; and closing the mold and applying gas pressure interiorly of the tube to blow mold the tube against the mold to produce the housing and to connect the housing to the support frame to form a unit.

In accordance with a further aspect of the invention, the objects are also achieved by providing a hollow body comprising a housing with an internal supporting frame, in which the housing is formed of synthetic resin and is produced by blow molding and encloses the supporting frame, and in which the supporting frame is connected to the housing at at least two contact points.

The essential advantage of the invention is that a supporting frame is produced first. It may, for example, be an injection molded plastic part. This supporting frame is placed in a blowing mold, and a plastic tube is drawn over the supporting frame. By closing the mold in which the supporting frame is situated, the outer contour of the housing is determined. The plastic tube is forced against the contour of the mold by introducing compressed air into the tube. Simultaneously, the plastic tube is connected to the supporting frame at the previously defined contact points and therefore forms a unit.

In order to improve the connection between the supporting frame and the contact points, the supporting frame may be provided with flattened portions, bulging projections or similar devices. These elements are enclosed by the blown tube. The supporting frame may be made of metal or plastic (i.e. synthetic resin) or any other suitable material.

In accordance with a further embodiment of the invention, the use of a plastic supporting frame and the achievement of a suitable material temperature during the manufacturing process causes the supporting frame and the housing to fuse together and form a cohesive connection between them. The supporting frame may also comprise longitudinal webs. It can be adapted in a simple manner to the requirements with respect to stability and optionally also to requirements with respect to the interior design of the housing. A housing produced in this manner may be used, for example, in automobile construction as a carbon canister, in which case the housing is closed by means of suitable lids. A carbon canister of this type is used for absorbing fuel vapors.

Another use in automobile construction is to provide a resonator chamber. It is known that the engine pulsation leads to intake noises which must be damped by appropriate measures. In such cases resonators have proved very useful. Such a resonator may, for example, comprise a molded body which is arranged in some unutilized space in the engine compartment. In this case, the supporting frame may assume additional functions such as the creation of specially configured interiors or the providing of passages which are especially advantageous from an acoustical point of view, such as an acoustic neck.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments depicted in the accompanying drawings in which.

DETAILED DESCRIPTION OF PREFERRED EMBODIMENTS

Figure 1:
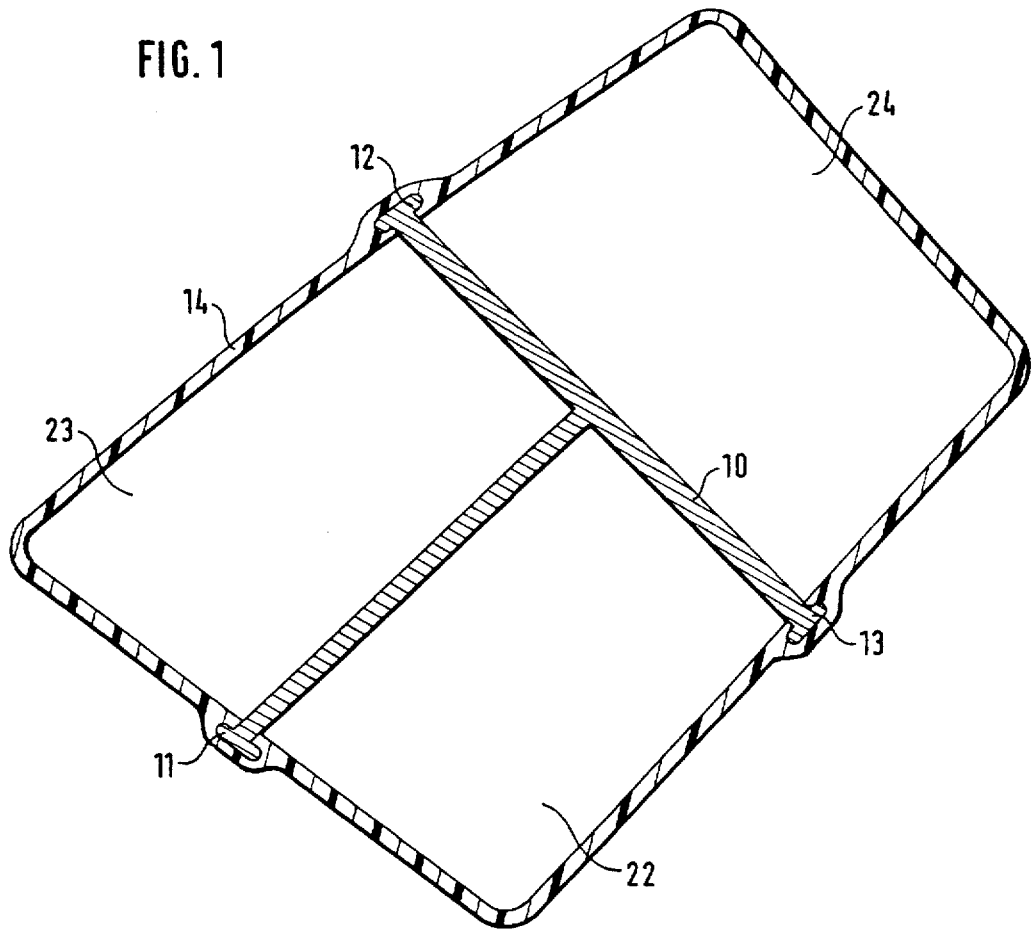
FIG. 1 is a sectional view of a hollow body produced by means of blow molding.

FIG. 1 is a sectional view of a hollow body produced by the blow molding method. It consists of a supporting frame 10 which has flattened portions 11, 12, 13 on its extreme ends. This supporting frame is surrounded by the housing 14 whose outer contour is shown.

Figure 1A:
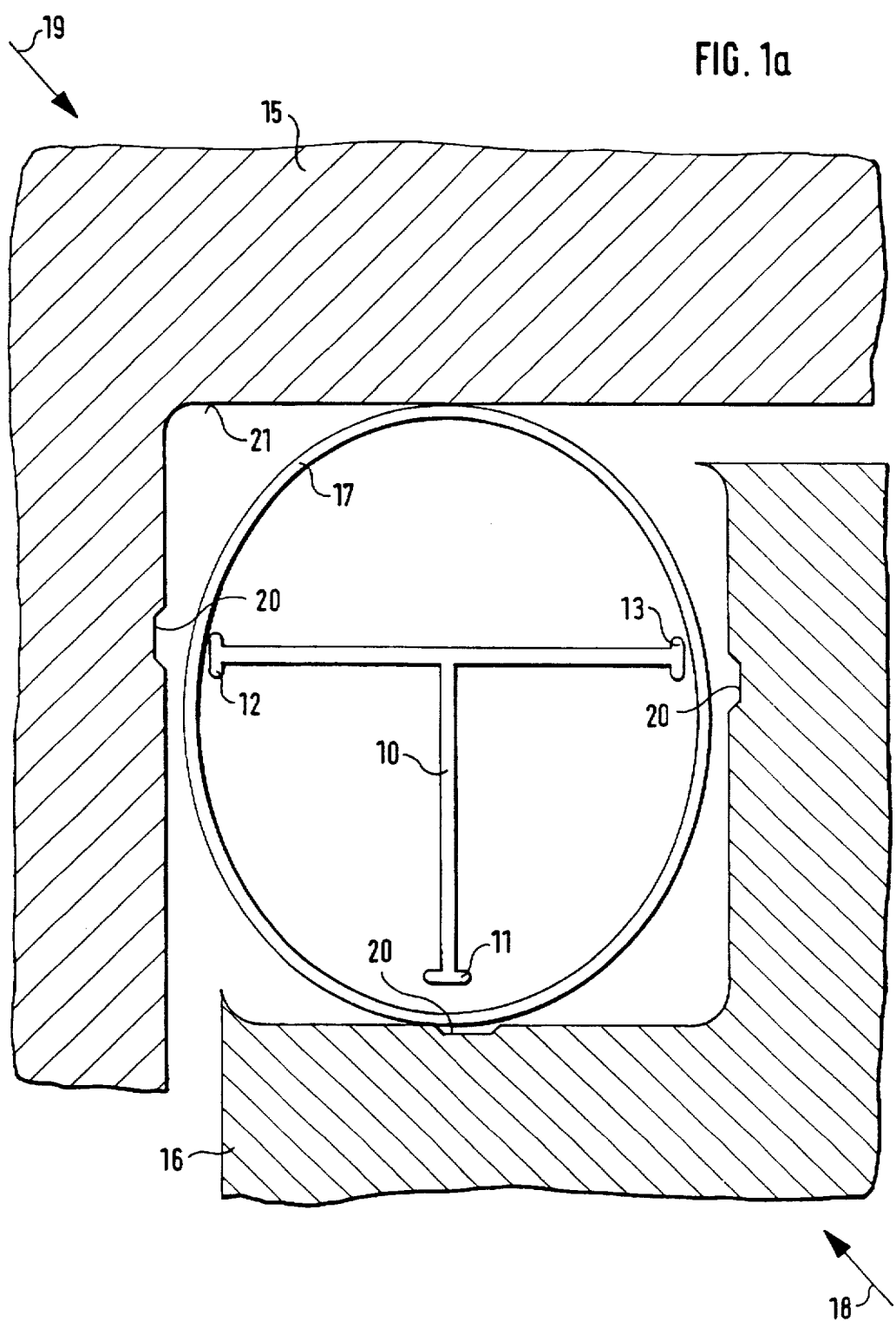
FIG. 1a is a diagrammatic view illustrating the method of making the hollow body of FIG. 1.

FIG. 1a shows the process steps for producing this hollow body. First, the supporting frame 10 is inserted in an open forming mold comprising two mold halves 15 and 16. The supporting frame 10 is fixed in the illustrated position by means of suitable devices. Then, the preformed tube 17, which is in a not yet completely hardened condition, is guided over the supporting frame 10, and the mold is closed as indicated by the arrows 18 and 19. In the illustrated embodiment, the flattened end portions 11, 12 and 13 are received in indentations 20 in the two mold halves 15 and 16, and simultaneously the tube 17 is pressed into the indentations.

After the closing of the mold, compressed air is applied to the interior of the tube. The tube is consequently forced against the inner contour 21 of the mold. After the cooling of the tube, this tube is cut to the desired length of the housing; the internal pressure is reduced, and the mold is opened. The finished housing can be removed. As illustrated in FIG. 1, during the shaping of the housing, the tube flows around the flattened portions 11, 12, 13 and thereby forms interlocking connections. In addition, if a plastic supporting frame is used and a suitable temperature of the tube is achieved, the flattened portions of the supporting frame will fuse to the material of the tube and form a cohesive connection between the supporting frame and the housing. As illustrated in FIG. 1, the supporting frame simultaneously forms three chambers 22, 23, 24. Because of the connections between the supporting frame and the housing, these chambers are sealed off with respect to one another.

Figure 2:
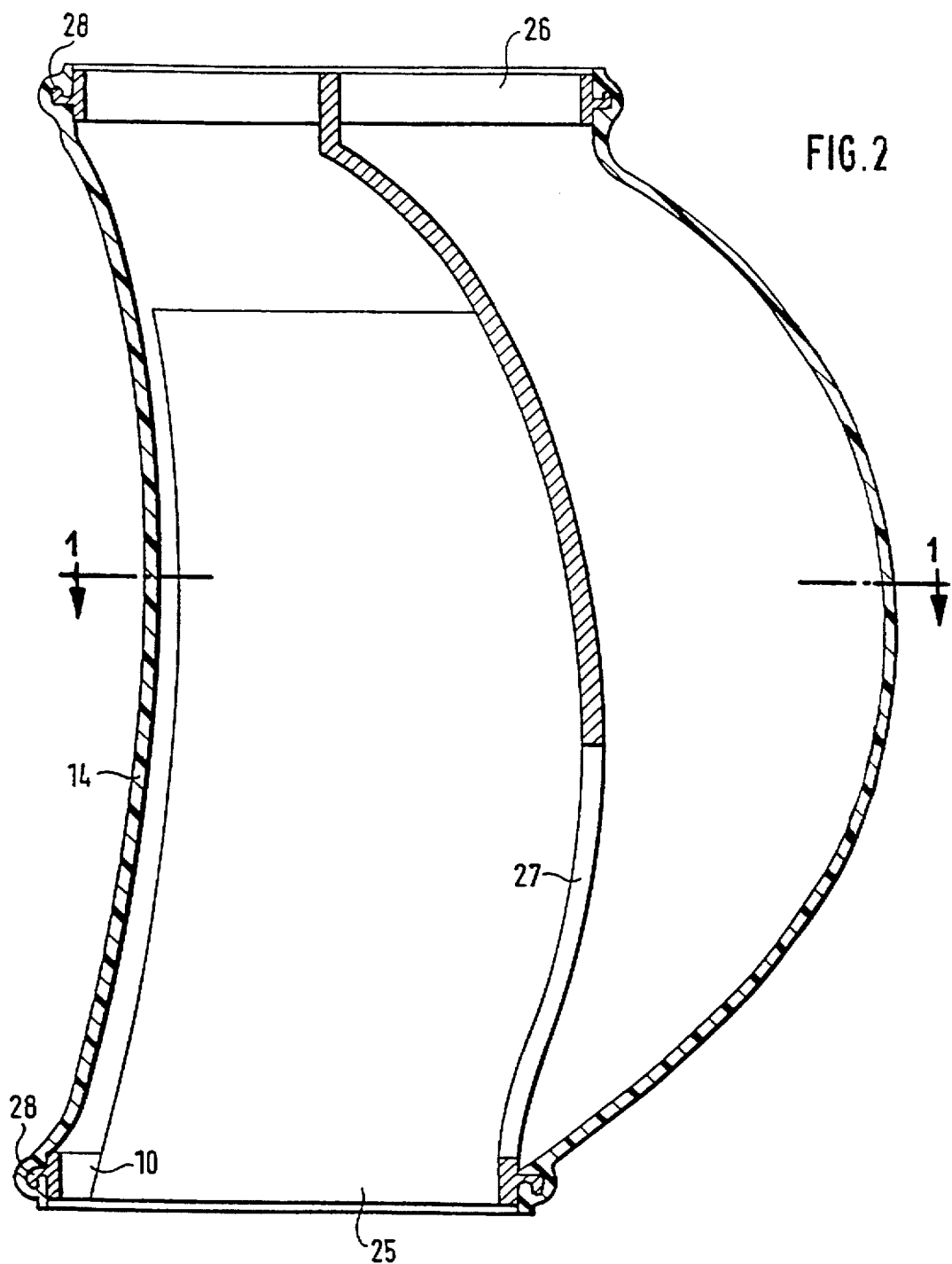
FIG. 2 is another sectional view of the hollow body of FIG. 1.

FIG. 2 shows a sectional view of the supporting frame 10 and the housing 14 of the hollow body of FIG. 1 turned by 90°. This figure shows that the supporting frame is also provided adjacent the two housing openings 25 and 26 with annular fastener tabs 28, and that the tube (or the housing 14) encloses these fastener tabs and thereby achieves an intimate connection. In the lower area of the Figure it can be seen that the supporting frame 10 is provided with an opening 27. This opening 27 is used to provide a defined connection between chamber 24 and chamber 23 (shown in FIG. 1).

Figure 3:
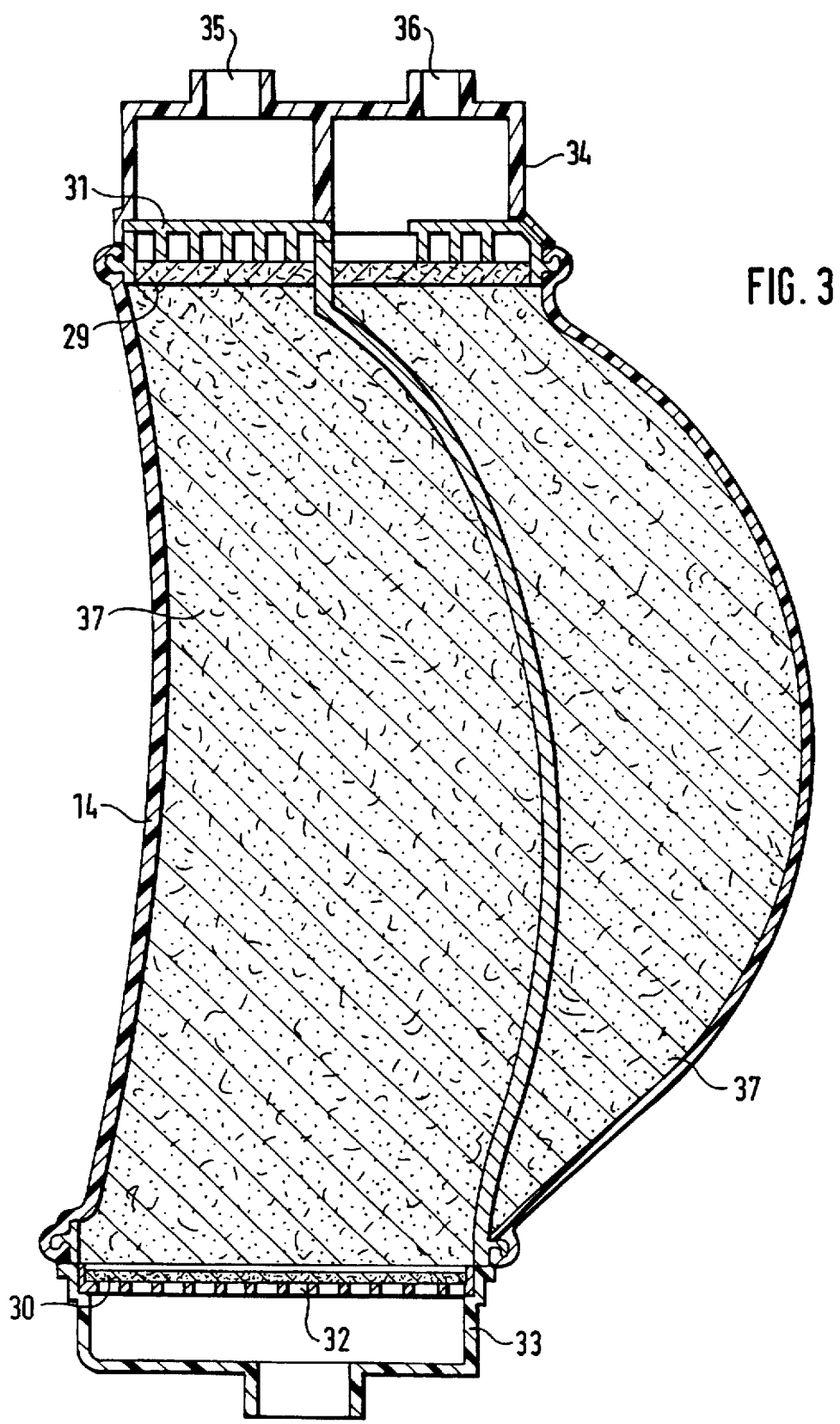
FIG. 3 is a sectional view of a hollow body being used as an activated carbon filter.

FIG. 3 shows a housing which is used as an activated carbon filter. Such an activated carbon filter has the purpose of ventilating the fuel tank and consists of an activated charcoal packing 37 which is arranged in a housing made of plastic, the housing being connected through respective connectors and via respective pipes with the fuel tank, the intake manifold of the internal-combustion engine, and the atmosphere. Such an activated carbon filter is known, for example, from German Patent No. DE 2,407,128.

The various chambers of the housing 14 are filled with activated carbon 37. The openings at the two housing ends are each provided with a filter foam, 29 and 30 respectively, as well as a perforated cover or lid, 31 and 32 respectively, to prevent discharge of the activated carbon. The openings are closed off by a bottom connecting piece 33 which is provided with a valve or a suitable opening, as well as a connecting cap 34, which also has openings 35, 36. The advantage of an activated carbon filter housing produced by blow molding is that the outer contour can be adapted in an optimum manner to a given installation space and this makes it possible to arrange such an activated carbon filter in a vehicle in a space-saving manner.

Of course, the invention is not limited to the use of the housing for an activated charcoal filter. There are many possible applications in which a housing must be adapted to a complicated contour or where a housing must be provided with a certain chamber structure.

The foregoing description and examples have been set forth merely to illustrate the invention and are not intended to be limiting. Since modifications of the described embodiments incorporating the spirit and substance of the invention may occur to persons skilled in the art, the invention should be construed broadly to include everything within the scope of the appended claims and equivalents thereof.

What is claimed is:

1. A hollow body comprising a continuous housing with an internal supporting frame, wherein said housing is formed of plastic material and is produced by blow molding and encloses the supporting frame, said housing having an inner contour and an outer contour which define a cross-sectional thickness of the housing, and wherein the supporting frame includes at least two contact portions which extend into said cross-sectional thickness of the housing and which connect the supporting frame to the housing.

2. A hollow body according to claim 1, wherein at least one of said contact portions of the supporting frame comprises an enlarged section which is at least partially enclosed within the cross-sectional thickness of the housing.

3. A hollow body according to claim 2, wherein said supporting frame is cohesively connected to the housing at the contact portions.

4. A hollow body according to claim 1, wherein at least one of said contact portions of the supporting frame comprises a longitudinal web.

5. A hollow body according to claim 4, wherein said longitudinal web extends transversely to an adjacent portion of said supporting frame such that said longitudinal web comprises an inward surfaces facing inwardly of said housing and an outward surface facing outwardly of said housing.

6. A hollow body according to claim 5, wherein both of said inward surface and said outward surface of the longitudinal web are enclosed within said cross-sectional thickness of the housing.

7. A hollow body according to claim 1, wherein the supporting frame is formed of a different material than the material of the housing.

8. A hollow body according to claim 1, wherein the supporting frame is formed of metal.

9. A hollow body according to claim 1, for communication with an air intake of an internal combustion engine, whereby the hollow body may be used as a resonator chamber for damping intake noise of the internal-combustion engine.

10. A hollow body comprising a housing with an internal supporting frame, wherein said housing is formed of plastic material and is produced by blow molding and encloses the supporting frame, said housing having an inner contour and an outer contour which define a cross-sectional thickness of the housing, and wherein the supporting frame includes at least two contact portions which extend into said cross-sectional thickness of the housing and which connect the supporting frame to the housing, wherein said hollow body defines a chamber, and said chamber is filled with activated carbon, said chamber having first and second open ends each provided with a lid, and wherein at least one of the lids is provided with connecting elements, whereby said hollow body may be used as an activated carbon filter for adsorbing fuel vapors.

11. A hollow body comprising a housing with an internal supporting frame, wherein said housing is formed of plastic material and is produced by blow molding and encloses the supporting frame, said housing having an inner contour and an outer contour which define a cross-sectional thickness of the housing, and the supporting frame including at least two contact portions which extend into said cross-sectional thickness of the housing and which connect the supporting frame to the housing, at least one of said contact portions of the supporting frame comprising an enlarged section which is at least partially enclosed within the cross-sectional thickness of the housing, and wherein said enlarged section extends transversely to an adjacent portion of said supporting frame such that said enlarged section comprises an inward surface facing inwardly of said housing and an outward surface facing outwardly of said housing.

12. A hollow body according to claim 11, wherein both of said inward surface and said outward surface of the enlarged section are enclosed within said cross-sectional thickness of the housing.

* * * * *